(12) United States Patent
Xiang et al.

(10) Patent No.: US 11,431,093 B2
(45) Date of Patent: Aug. 30, 2022

(54) UNMANNED AERIAL VEHICLE BUILT-IN DUAL-BAND ANTENNA AND UNMANNED AERIAL VEHICLE

(71) Applicant: AUTEL ROBOTICS CO., LTD., Guangdong (CN)

(72) Inventors: Shengzhao Xiang, Guangdong (CN); Yiye Sun, Guangdong (CN); Xuefeng Sun, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 196 days.

(21) Appl. No.: 16/993,575

(22) Filed: Aug. 14, 2020

(65) Prior Publication Data

US 2020/0373667 A1 Nov. 26, 2020

Related U.S. Application Data

(63) Continuation of application No. PCT/CN2018/110621, filed on Oct. 17, 2018.

(30) Foreign Application Priority Data

Feb. 14, 2018 (CN) .......................... 201810151723.X

(51) Int. Cl.
*H01Q 1/38* (2006.01)
*H01Q 5/307* (2015.01)
(Continued)

(52) U.S. Cl.
CPC ............. *H01Q 5/307* (2015.01); *B64C 1/36* (2013.01); *B64C 39/024* (2013.01); *H01Q 1/48* (2013.01);
(Continued)

(58) Field of Classification Search
CPC ........ H01Q 5/307; H01Q 1/48; H01Q 9/0407; H01Q 9/16; H01Q 9/30; B64C 39/024
See application file for complete search history.

(56) References Cited

U.S. PATENT DOCUMENTS

2011/0156946 A1* 6/2011 Margomenos .......... G01S 7/032
342/175
2016/0094091 A1 3/2016 Shin et al.

FOREIGN PATENT DOCUMENTS

CN 106981726 A 7/2017
CN 107004945 A 8/2017
(Continued)

OTHER PUBLICATIONS

International Search Report dated Dec. 29, 2018; PCT/CN2018/110621.

*Primary Examiner* — Joseph J Lauture

(57) ABSTRACT

The present invention provides an unmanned aerial vehicle built-in dual-band antenna and an unmanned aerial vehicle. The unmanned aerial vehicle built-in dual-band antenna includes a first frequency band microstrip antenna and a second frequency band microstrip antenna. The first frequency band microstrip antenna includes a first substrate, a first microstrip feeder and a grounding terminal that are disposed on a first surface of the first substrate, a grounding terminal disposed on a second surface of the first substrate and a feeding coaxial line. A feed terminal of the feeding coaxial line is connected to a first terminal of the first microstrip feeder, and a grounding terminal of the feeding coaxial line is connected to the grounding terminal of the first surface. The grounding terminal of the first surface is connected to the grounding terminal of the second surface. The second frequency band microstrip antenna includes a second substrate and a second microstrip feeder disposed on the second substrate. The first frequency band microstrip (Continued)

antenna is connected to the second frequency band microstrip antenna.

20 Claims, 4 Drawing Sheets

(51) Int. Cl.
*B64C 1/36* (2006.01)
*B64C 39/02* (2006.01)
*H01Q 1/48* (2006.01)
*H01Q 9/04* (2006.01)
*H01Q 9/16* (2006.01)
*H01Q 9/30* (2006.01)

(52) U.S. Cl.
CPC ............ *H01Q 9/0407* (2013.01); *H01Q 9/16* (2013.01); *H01Q 9/30* (2013.01); *B64C 2201/12* (2013.01)

(56) References Cited

FOREIGN PATENT DOCUMENTS

| | | |
|---|---|---|
| CN | 207009650 U | 2/2018 |
| CN | 108417978 A | 8/2018 |
| CN | 207967302 U | 10/2018 |

\* cited by examiner

UNMANNED AERIAL VEHICLE BUILT-IN DUAL-BAND ANTENNA AND UNMANNED AERIAL VEHICLE

CROSS-REFERENCE

This application is a continuation application of International Application No. PCT/CN2018/110621, filed on Oct. 17, 2018, which claims priority of Chinese Patent Application No. 201810151723.X, filed on Feb. 14, 2018, which is incorporated herein by reference in its entirely.

BACKGROUND

Technical Field

The present invention relates to the field of antenna technologies, and in particular, to an unmanned aerial vehicle built-in dual-band antenna and an unmanned aerial vehicle.

Related Art

With the rapid development of wireless communications and the requirements of various data services, antennas are mainly designed to be smaller with a plurality of frequency bands and broad frequency bands. Microstrip antennas are more widely used due to their compact structure, small size, light weight, low costs and easy integration with microstrip lines. A microstrip antenna is an antenna consisting of a conductor patch affixed to a dielectric substrate with a grounding plate, and uses a coaxial wire to feed power, so that an electromagnetic field is excited between the conductor patch and the grounding plate, to radiate outward using a slit.

An existing unmanned aerial vehicle built-in dual-band antenna is usually disposed in a landing gear and is usually a microstrip antenna of 2.4 Hz or 5.8 Hz. Due to its relatively large size and a limitation by a size of a landing gear, a microstrip antenna working in a low frequency band (for example, a microstrip antenna of 900 MHz) cannot be disposed in the landing gear. Although a spatial size of an arm of the unmanned aerial vehicle is larger than that of the landing gear of the unmanned aerial vehicle, an environment of the arm of the unmanned aerial vehicle is more complex, easily affecting a communication signal of the antenna.

Therefore, a person skilled in the art urgently needs an unmanned aerial vehicle built-in dual-band antenna that can resolve problems of spatial size and environmental interference.

SUMMARY

The present invention provides an unmanned aerial vehicle built-in dual-band antenna and an unmanned aerial vehicle to implement an unmanned aerial vehicle built-in dual-band antenna that can resolve problems of spatial size and environmental interference.

To resolve the above technical problem, the following technical solutions are provided in the present invention:

According to a first aspect, the present invention provides an unmanned aerial vehicle built-in dual-band antenna, including:

a first frequency band microstrip antenna and a second frequency band microstrip antenna.

The first frequency band microstrip antenna includes a first substrate, a first microstrip feeder disposed on a first surface of the first substrate, a grounding terminal disposed on the first surface of the first substrate, a grounding terminal disposed on a second surface of the first substrate and a feeding coaxial line.

A feed terminal of the feeding coaxial line is connected to a first terminal of the first microstrip feeder, and a grounding terminal of the feeding coaxial line is connected to the grounding terminal of the first surface.

The grounding terminal of the first surface is connected to the grounding terminal of the second surface.

The second frequency band microstrip antenna includes a second substrate and a second microstrip feeder disposed on the second substrate. The first frequency band microstrip antenna is connected to the second frequency band microstrip antenna.

In a possible implementation, the grounding terminal of the second surface of the first substrate is connected to a motor of the unmanned aerial vehicle.

In a possible implementation, the first microstrip feeder is connected to a motor of the unmanned aerial vehicle.

In a possible implementation, the first frequency band microstrip antenna further includes:

a U-shaped structure disposed on the second surface of the first substrate.

The grounding terminal of the second surface is disposed along a length direction of the first substrate and is located in the middle of an opening of the U-shaped structure. The grounding terminal of the second surface is connected to the motor through a bottom end of the U-shaped structure. The opening of the U-shaped structure faces a direction towards the feeding coaxial line.

In a possible implementation, the first frequency band microstrip antenna further includes:

a U-shaped structure disposed on the second surface of the first substrate.

The grounding terminal of the second surface is disposed along a length direction of the first substrate and is located in the middle of an opening of the U-shaped structure. The grounding terminal of the second surface is connected to the second microstrip feeder through a bottom end of the U-shaped structure. The opening of the U-shaped structure faces a direction towards the feeding coaxial line.

In a possible implementation, a shape of the first microstrip feeder is a straight line along the length direction of the first substrate; and a shape of the second microstrip feeder is a curve.

In a possible implementation, the dual-band antenna further includes at least one through hole provided on the first substrate.

The grounding terminal of the first surface is connected to the grounding terminal of the second surface through the at least one through hole.

In a possible implementation, the second microstrip feeder is connected to a second terminal of the first microstrip feeder.

In a possible implementation, the first substrate is made of an FR-4 grade material; and the second substrate is made of an FR-4 grade material.

In a possible implementation, the first frequency band microstrip antenna is a microstrip antenna of 900 MHz; and the second frequency band microstrip antenna is a microstrip antenna of 2.4 GHz.

In a second aspect, the present invention provides an unmanned aerial vehicle, including:

an arm and a landing gear, and further including the unmanned aerial vehicle built-in dual-band antenna according to the first aspect. The first frequency band microstrip antenna of the unmanned aerial vehicle built-in dual-band antenna is disposed in the arm, and the second frequency band microstrip antenna of the unmanned aerial vehicle built-in dual-band antenna is disposed in the landing gear.

According to the unmanned aerial vehicle built-in dual-band antenna and the unmanned aerial vehicle provided in the present invention, the dual-band antenna includes a first frequency band microstrip antenna and a second frequency band microstrip antenna. The first frequency band microstrip antenna includes a first substrate, a first microstrip feeder disposed on a first surface of the first substrate, a grounding terminal disposed on the first surface of the first substrate, a grounding terminal disposed on a second surface of the first substrate and a feeding coaxial line. A feed terminal of the feeding coaxial line is connected to a first terminal of the first microstrip feeder, and a grounding terminal of the feeding coaxial line is connected to the grounding terminal of the first surface. The grounding terminal of the first surface is connected to the grounding terminal of the second surface. The second frequency band microstrip antenna includes a second substrate and a second microstrip feeder disposed on the second substrate. The first frequency band microstrip antenna is connected to the second frequency band microstrip antenna. The above first frequency band microstrip antenna and second frequency band microstrip antenna can be built in the unmanned aerial vehicle and meet a built-in spatial size requirement. Moreover, due to existence of the grounding terminal of the second surface, internal cables inside the unmanned aerial vehicle such as motor wires, lamp panel wires and coaxial wires of other antennas have less environmental interference impact on the built-in dual-band antenna, thereby enabling the built-in dual-band antenna to work normally in a complex electromagnetic environment.

BRIEF DESCRIPTION OF THE DRAWINGS

To more clearly describe the technical solutions in the embodiments of the present application or in the prior art, the following will briefly introduce the drawings required for describing the embodiments or the prior art. It is apparent that the drawings in the following description are only some embodiments described in the present invention, and a person of ordinary skill in the art may obtain drawings of other embodiments on the basis of these drawings without any creative effort.

DESCRIPTION OF REFERENCE NUMERALS

Figure 1:
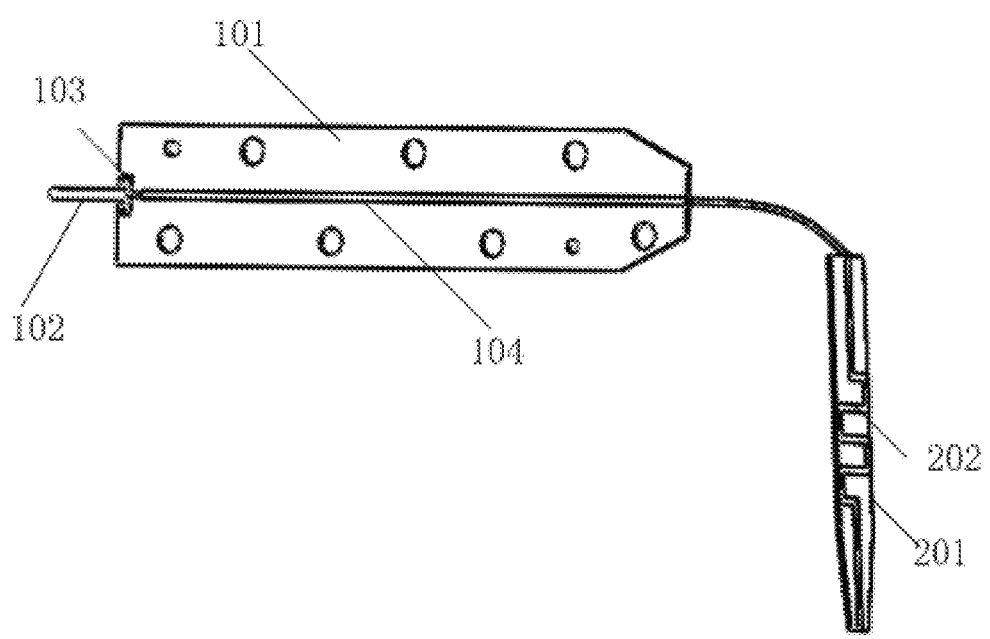
FIG. 1 is a partial schematic structural diagram of an embodiment of an unmanned aerial vehicle built-in dual-band antenna according to the present invention.

101. First substrate
102. Feeding coaxial line
103. Grounding terminal of first surface
104. First microstrip feeder
105, 106. Conducting wire or metal wire
107. Grounding terminal of second surface
108. U-shaped structure
201. Second substrate
202. Second microstrip feeder
301. Motor

DETAILED DESCRIPTION

The following describes specific implementations of the present invention in detail with reference to the accompanying drawings.

In the description of the present invention, it should be understood that orientation or position relationships indicated by the terms such as "top", "bottom", "front", "back", "left", and "right" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present invention.

In addition, the terms "first" and "second" are merely for the purpose of description, and cannot be construed as indicating or implying relative importance or implicitly specifying the number of technical features indicated. Therefore, the features defined with "first" and "second" may include at least one of the features explicitly or implicitly.

In the present invention, unless otherwise explicitly specified and defined, terms such as "mounted", "connected", "fixed" should be understood in broad sense, for example, fixed connection, detachable connection, or integral connection; or the connection may be a direct connection, an indirect connection through an intermediary, or internal communication between two elements or mutual action relationship between two elements, unless otherwise specified explicitly. The specific meanings of the above terms in the present invention may be understood according to specific circumstances for a person of ordinary skill in the art.

In the present invention, unless otherwise clearly specified and limited, that a first feature is "above" or "below" a second feature may be that the first and the second features are in contact with each other directly, or the first and the second features are in contact with each other indirectly by using an intermediate medium. Moreover, the first feature is "over", "above", and "on" the second feature may mean that the first feature is directly above or obliquely above the second feature, or simply means that the first feature has a higher horizontal height than the second feature. The first feature is "under", "below" and "underneath" the second feature may mean that the first feature is directly below or obliquely below the second feature, or simply means that the first feature has a lower horizontal height than the second feature.

A built-in antenna provided in the embodiments of the present invention may be applied to an unmanned aerial vehicle. An unmanned aerial vehicle in the embodiments of the present invention may be applied to a military scenario and a civil scenario. The civil scenario includes aerial photography, express transportation, disaster relief, wildlife observation, surveying and mapping, news reporting, electric checking and the like.

The technical solutions of the present invention are described in detail below by using specific embodiments. The following specific embodiments may be mutually combined, and same or similar concepts or processes may not be repeatedly described in some embodiments.

Figure 3:
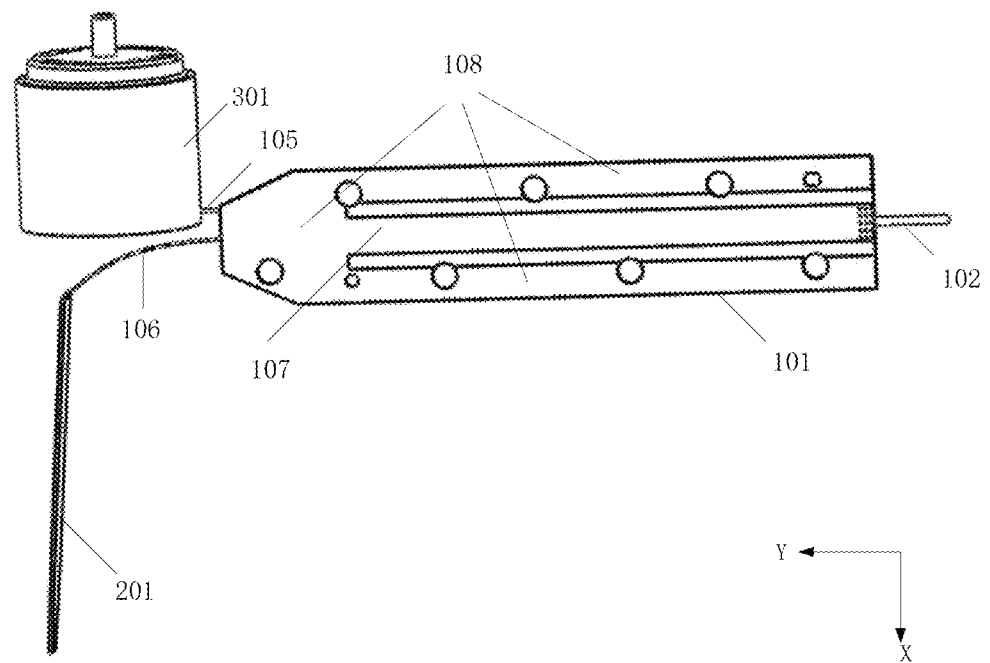
FIG. 3 is a second schematic structural diagram of an embodiment of an unmanned aerial vehicle built-in dual-band antenna according to the present invention.

FIG. 1 is a partial schematic structural diagram of an embodiment of an unmanned aerial vehicle built-in dual-band antenna according to the present invention. FIG. 3 is a schematic structural diagram of an embodiment of an unmanned aerial vehicle built-in dual-band antenna according to the present invention, showing a viewing angle opposite to FIG. 1. As shown in FIG. 1 and FIG. 3, the unmanned aerial vehicle built-in dual-band antenna of this embodiment may include:

a first frequency band microstrip antenna and a second frequency band microstrip antenna.

The first frequency band antenna includes a first substrate 101, a first microstrip feeder 104 disposed on a first surface of the first substrate 101, a grounding terminal 103 disposed on the first surface of the first substrate 101, a grounding terminal 107 disposed on a second surface of the first substrate 101 and a feeding coaxial line 102.

The second frequency band microstrip antenna includes a second substrate 201 and a second microstrip feeder 202 disposed on the second substrate 201. The first frequency band microstrip antenna is connected to the second frequency band microstrip antenna.

Specifically, a feed terminal of the feeding coaxial line 102 is connected to a first terminal of the first microstrip feeder 104, and a grounding terminal of the feeding coaxial line 102 is connected to the grounding terminal 103 of the first surface.

The grounding terminal 103 of the first surface is connected to the grounding terminal 107 of the second surface.

Specifically, due to a limited size of a landing gear of the unmanned aerial vehicle, only a high frequency-band microstrip antenna, for example, an antenna of 2.4 GHz can be accommodated. Therefore, the first channel microstrip antenna (a microstrip antenna of a low frequency band, for example, 900 MHz) is placed in an arm of the unmanned aerial vehicle with a complex environment. Finally the first channel microstrip antenna can still work normally in a complex environment with motor wires and lamp panel wires. The second channel microstrip antenna (for example, the microstrip antenna of 2.4 GHz) is placed in the landing gear.

As shown in FIG. 1 and FIG. 3, main radiation units of the first frequency band antenna include the first substrate 101, the first microstrip feeder 104 disposed on the first surface of the first substrate 101, the grounding terminal 103 disposed on the first surface of the first substrate 101 and the grounding terminal 107 disposed on the second surface of the first substrate 101.

The feed terminal of the feeding coaxial line 102 is connected to the first terminal of the first microstrip feeder 104, and the grounding terminal of the feeding coaxial line 102 is connected to the grounding terminal 103 of the first surface.

The grounding terminal 103 of the first surface is connected to the grounding terminal 107 of the second surface.

Main radiation units of the second frequency band microstrip antenna include the second substrate 201 and the second microstrip feeder 202 disposed on the second substrate 201.

The existence of the grounding terminal 107 of the second surface minimizes impact of the motor wires and the lamp panel wires in the arm on the first frequency band microstrip antenna, thereby enabling the antenna to work normally in a complex electromagnetic environment.

In some implementations, the first substrate is made of an FR-4 grade material.

In some implementations, the second substrate is made of an FR-4 grade material.

Specifically, FR-4 is a designation for a grade of a flame-resistant material, which represents a specification of a material that needs to be self-extinguishing after a burning state of a resin material. It is not a material name but a material grade. At present, there are many different types of FR-4 grade materials used in general circuit boards, but most of them are composite materials made of the tera-function epoxy resin with fillers and glass fibers.

In some implementations, the dual-band antenna further includes at least one through hole provided on the first substrate 101.

The grounding terminal 103 of the first surface is connected to the grounding terminal 107 of the second surface through the at least one through hole.

An overall size of the relatively large first substrate of the first frequency band microstrip antenna placed in the arm of the unmanned aerial vehicle is, for example, 87×18×0.6 mm$^3$, that is, a length of the first substrate is 87 mm, a width of the first substrate is 18 mm, and a thickness of the first substrate is 0.6 mm. An overall size of the relatively small second substrate of the second frequency band microstrip antenna placed in the landing gear is, for example, 47×7×0.8 mm$^3$, that is, a length of the second substrate is 47 mm, a width of the second substrate is 7 mm, and a thickness of the second substrate is 0.8 mm.

In some implementations, as shown in FIG. 1, a shape of the first microstrip feeder 104 is a straight line along the length direction of the first substrate 101.

Figure 4:
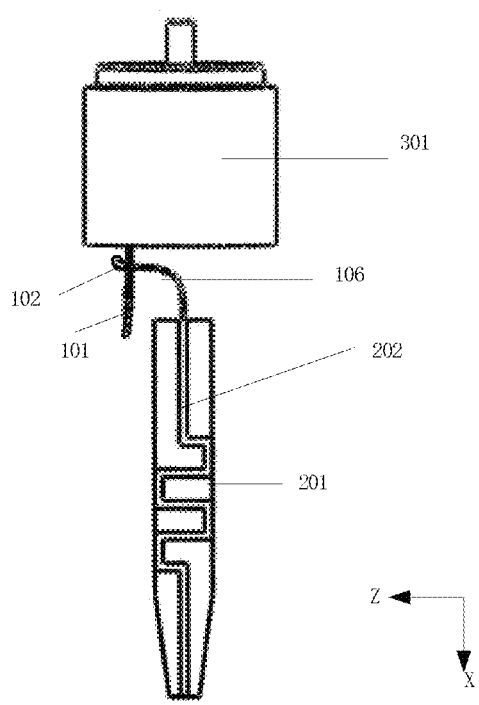
FIG. 4 is a third schematic structural diagram of an embodiment of an unmanned aerial vehicle built-in dual-band antenna according to the present invention.

As shown in FIG. 4, to properly use the space and implement the second frequency band microstrip antenna within a limited space, a shape of the second microstrip feeder 202 may be a curve.

It should be noted that the above first frequency band microstrip antenna adopts a form of a dipole, and the second frequency band microstrip antenna adopts a form of a monopole. In other embodiments, the second frequency band microstrip antenna may alternatively adopt other antenna forms such as a dipole and an annular antenna. In other embodiments, the first frequency band microstrip antenna may alternatively adopt other antenna forms such as a monopole and an annular antenna.

The unmanned aerial vehicle built-in dual-band antenna in this embodiment includes a first frequency band microstrip antenna and a second frequency band microstrip antenna. The first frequency band microstrip antenna includes a first substrate, a first microstrip feeder disposed on a first surface of the first substrate, a grounding terminal disposed on the first surface of the first substrate, a grounding terminal disposed on a second surface of the first substrate and a feeding coaxial line. A feed terminal of the feeding coaxial line is connected to a first terminal of the first microstrip feeder, and a grounding terminal of the feeding coaxial line is connected to the grounding terminal of the first surface. The grounding terminal of the first surface is connected to the grounding terminal of the second surface. The second frequency band microstrip antenna includes a second substrate and a second microstrip feeder disposed on the second substrate. The first frequency band microstrip antenna is connected to the second frequency band microstrip antenna. The above first frequency band microstrip antenna and second frequency band microstrip antenna can be built in the unmanned aerial vehicle and meet a built-in spatial size requirement. Moreover, due to existence of the grounding terminal of the second surface, internal cables inside the unmanned aerial vehicle such as motor wires and lamp panel wires have less environmental interference impact on the first frequency band microstrip antenna, thereby enabling the antenna to work normally in a complex electromagnetic environment.

Based on the above embodiments, optionally, as shown in FIG. 3, the grounding terminal 107 of the second surface of the first substrate 101 is connected to the motor 301 of the unmanned aerial vehicle.

Specifically, the grounding terminal 107 of the second surface of the first substrate 101 is connected to a base of the motor 301 by a conducting wire or a metal wire, making the motor become a part of the first frequency band microstrip antenna. Therefore, the antenna is enlarged, and the first frequency band microstrip antenna is made to produce resonance at a frequency of, for example, of 900 MHz, so that the first frequency band microstrip antenna can work normally in a low frequency band, for example, 900 MHz, and a working bandwidth of the first frequency band microstrip antenna is expanded.

Optionally, as shown in FIG. 3, the first frequency band microstrip antenna, further includes:

a U-shaped structure 108 disposed on the second surface of the first substrate 101.

The grounding terminal 107 of the second surface is disposed along a length direction of the first substrate 101 and is located in the middle of an opening of the U-shaped structure 108. The grounding terminal 107 of the second surface is connected to the motor 301 through a bottom end of the U-shaped structure 108. The opening of the U-shaped structure 108 faces a direction towards the feeding coaxial line 102.

Specifically, the bottom of the U-shaped structure 108, that is, an end being opposite to the opening, is connected to the grounding terminal 107 of the second surface and the motor 301. Optionally, the bottom of the U-shaped structure 108 is connected to the motor 301 by a conducting wire or a metal wire (denoted as 105 in the figure).

The motor 301 is connected to the U-shaped structure 108 by the conducting wire or metal wire 105, so that the antenna is enlarged and the first frequency band microstrip antenna is made to produce resonance at a frequency of, for example, 900 MHz. Therefore, the first frequency band microstrip antenna can work normally in a low frequency band, for example, 900 MHz, and the working bandwidth of the first frequency band microstrip antenna is expanded.

The U-shaped structure 108, on one hand, becomes a radiation body of the first frequency band microstrip antenna, and on the other hand, has an effect on choking an electric current.

It should be noted that the grounding terminal 107 of the second surface where the second surface of the first frequency band micro strip antenna is in contact with the motor wire and the lamp panel wire may be located in the middle of the first substrate, that is, in the middle of the U-shaped structure 108, or the grounding terminal 107 of the second surface may be located on the second surface of the first substrate where it overlaps projections of the motor wire and the lamp panel wire.

Figure 5:
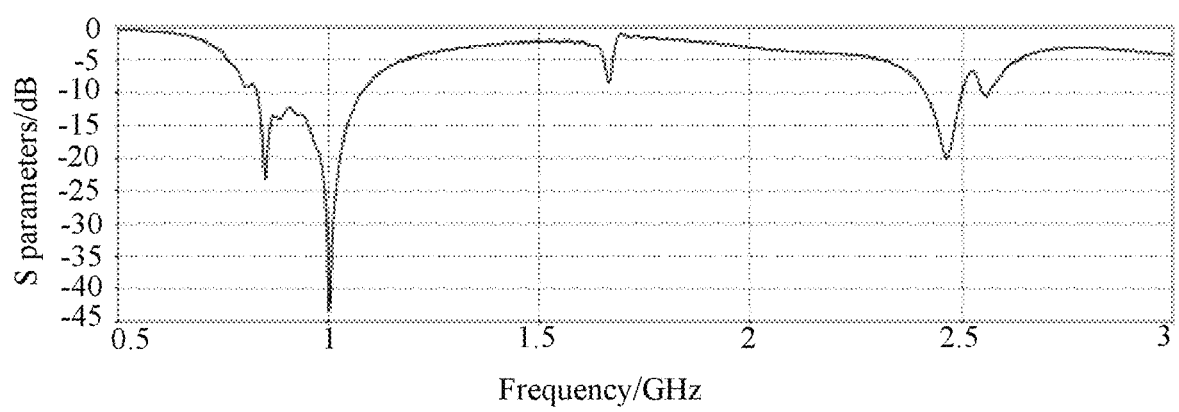
FIG. 5 is a schematic diagram of dual-band microstrip antenna scattering parameters of an embodiment of an unmanned aerial vehicle built-in dual-band antenna according to the present invention.

Dual-band microstrip antenna scattering parameters (S parameters) are shown in FIG. 5. It may be learned from FIG. 5 that the dual-band antenna may work in frequency band ranges of 830-1080 MHz and 2.4-2.5 GHz, and the bandwidths are 250 MHz and 100 MHz respectively, which meets coverage of common frequency bands of 900 MHz and 2.45 GHz.

It should be noted that, in this embodiment of the present invention, the first frequency band microstrip antenna and second channel microstrip antenna may further work in two other different frequency bands.

Figure 6:
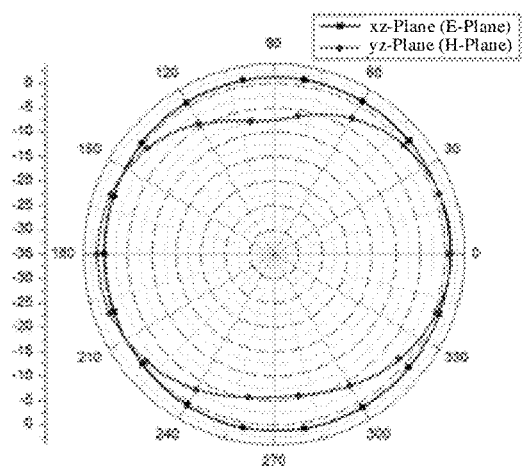
FIG. 6 is a radiation pattern of a 900 M antenna of an embodiment of an unmanned aerial vehicle built-in dual-band antenna according to the present invention.
Figure 7:
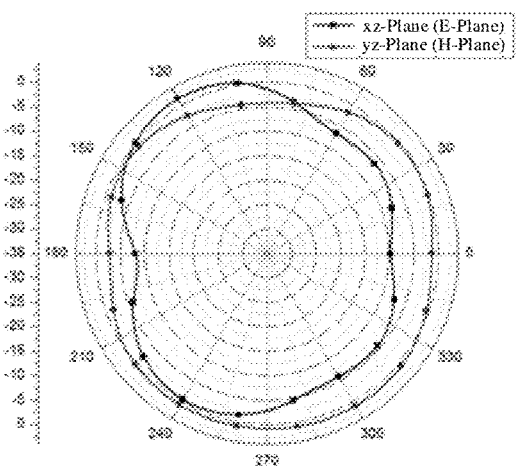
FIG. 7 is a radiation pattern of a 2.4 GHz antenna of an embodiment of an unmanned aerial vehicle built-in dual-band antenna according to the present invention.

Radiation patterns of the dual-band antenna are FIG. 6 and FIG. 7. It may be learned from the figures that the dual-band antenna of 900 MHz and 2.45 GHz basically can achieve omnidirectional coverage.

In the above specific implementations, existence of the grounding terminal of the second surface minimizes impact of the motor wires and the lamp panel wires in the arm on the first frequency band microstrip antenna, thereby enabling the antenna to work normally in a complex electromagnetic environment. In addition, because the motor becomes a part of the first frequency band microstrip antenna, the antenna is enlarged, and the working bandwidth of the first frequency band microstrip antenna is expanded.

Figure 2:
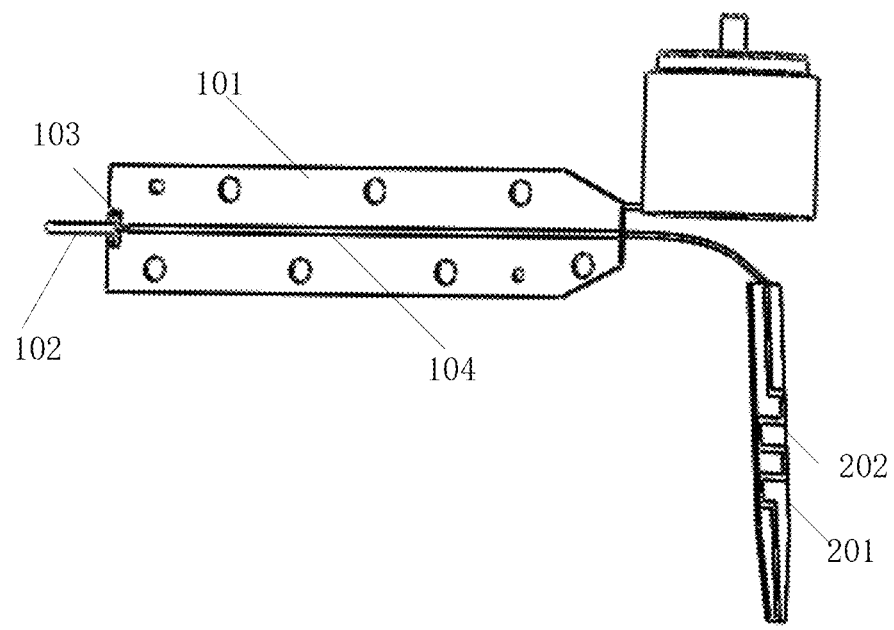
FIG. 2 is a first schematic structural diagram of an embodiment of an unmanned aerial vehicle built-in dual-band antenna according to the present invention.

Based on the above embodiments, optionally, as shown in FIG. 2, the second microstrip feeder 202 is connected to a second terminal of the first microstrip feeder 104, so that the microstrip antenna in two frequency bands share one feeding coaxial line 102, that is, share one feed port. The feeding coaxial line 102 is connected to a radio frequency board of the unmanned aerial vehicle.

As shown in FIG. 4, the second microstrip feeder 202 is connected to the second terminal of the first microstrip feeder 104 by a conducting wire or a metal wire (denoted as 106 in the figure).

In this embodiment of the present invention, one feeding coaxial line is adopted to simultaneously feed power to the microstrip antennas in two channels, thereby simplifying a feed structure of the antenna.

In some implementations, as shown in FIG. 2 and FIG. 3, the first microstrip feeder 104 is connected to the motor 301 of the unmanned aerial vehicle, and the U-shaped structure 108 is connected to the second microstrip feeder 202. The principle is similar to that in the above embodiment. The U-shaped structure 108 is connected to the second microstrip feeder 202 by the conducting wire or the metal wire 105, so that the antenna is enlarged and the first frequency band microstrip antenna is made to produce resonance at a frequency of, for example, 900 MHz. Therefore, the first frequency band microstrip antenna can work normally in a low frequency band, for example, 900 MHz, and the working bandwidth of the first frequency band microstrip antenna is expanded. Two ends of each of the U-shaped structure 108 of the first frequency band microstrip antenna and the first microstrip feeder 104 are symmetrically expanded, to enable the first frequency band microstrip antenna to reach an overall balanced structure, thereby further improving performance thereof.

In this embodiment of the present invention, the conducting wire or the metal wire may be used to connect the U-shaped structure and the motor, or to connect an antenna feeder part (that is, the first microstrip feeder 104) and the motor. Alternatively, the motor may be electrically connected to the U-shaped structure of the antenna or the antenna feeder part by a metal sheet or in other manners.

An embodiment of the present invention further provides an unmanned aerial vehicle, including an arm and a landing gear, and further including the unmanned aerial vehicle built-in dual-band antenna according to any of the above embodiments. The first frequency band microstrip antenna of the unmanned aerial vehicle built-in dual-band antenna is disposed in the arm, and the second frequency band microstrip antenna of the unmanned aerial vehicle built-in dual-band antenna is disposed in the landing gear.

In this embodiment, implementation principles and technical effects of the unmanned aerial vehicle built-in dual-band antenna are similar to those in the foregoing embodiments. Details are not described herein again.

The unmanned aerial vehicle in this embodiment includes an arm, a landing gear and an unmanned aerial vehicle built-in dual-band antenna. The unmanned aerial vehicle built-in dual-band antenna includes a first frequency band microstrip antenna and a second frequency band microstrip antenna. The first frequency band microstrip antenna includes a first substrate, a first microstrip feeder disposed on a first surface of the first substrate, a grounding terminal disposed on the first surface of the first substrate, a grounding terminal disposed on a second surface of the first substrate and a feeding coaxial line. A feed terminal of the feeding coaxial line is connected to a first terminal of the first microstrip feeder, and a grounding terminal of the feeding coaxial line is connected to the grounding terminal of the first surface. The grounding terminal of the first surface is connected to the grounding terminal of the second surface. The second frequency band microstrip antenna includes a second substrate and a second microstrip feeder disposed on the second substrate. The first frequency band microstrip antenna is connected to the second frequency band microstrip antenna. The first frequency band microstrip antenna of the unmanned aerial vehicle built-in dual-band antenna is disposed in the arm, the second frequency band microstrip antenna of the unmanned aerial vehicle built-in dual-band antenna is disposed in the landing gear, and meets a built-in spatial size requirement. Moreover, due to existence of the grounding terminal of the second surface, internal cables inside the unmanned aerial vehicle such as motor wires and lamp panel wires have less environmental interference impact on the first frequency band microstrip antenna, thereby enabling the antenna to work normally in a complex electromagnetic environment.

The preferred embodiments of the present invention are described in detail above with reference to the accompanying drawings, but the present invention is not limited to the specific details in the above embodiments. Various simple variations may be made to the technical solutions of the present invention within the scope of the technical idea of the present invention, and such simple variations shall all fall within the protection scope of the present invention.

It should be further noted that the specific technical features described in the above specific embodiments may be combined in any suitable manner without contradiction. To avoid unnecessary repetition, various possible combinations are not further described in the present invention.

In addition, the various embodiments of the present invention may be combined without departing from the idea of the present invention, and such combinations shall also fall within the scope of the present invention.

What is claimed is:

1. An unmanned aerial vehicle built-in dual-band antenna, comprising:
    a first frequency band microstrip antenna and a second frequency band microstrip antenna, wherein
    the first frequency band microstrip antenna comprises a first substrate, a first microstrip feeder disposed on a first surface of the first substrate, a grounding terminal disposed on the first surface of the first substrate, a grounding terminal disposed on a second surface of the first substrate and a feeding coaxial line;
    a feed terminal of the feeding coaxial line being connected to a first terminal of the first microstrip feeder, and a grounding terminal of the feeding coaxial line being connected to the grounding terminal of the first surface; and
    the grounding terminal of the first surface being connected to the grounding terminal of the second surface; and
    the second frequency band microstrip antenna comprises a second substrate and a second microstrip feeder disposed on the second substrate, the first frequency band microstrip antenna being connected to the second frequency band microstrip antenna.

2. The dual-band antenna according to claim 1, wherein the grounding terminal of the second surface of the first substrate is connected to a motor of the unmanned aerial vehicle.

3. The dual-band antenna according to claim 2, wherein the first frequency band microstrip antenna further comprises:
    a U-shaped structure disposed on the second surface of the first substrate;
    the grounding terminal of the second surface being disposed along a length direction of the first substrate and being located in the middle of an opening of the U-shaped structure; the grounding terminal of the second surface being connected to the motor through a bottom end of the U-shaped structure; and the opening of the U-shaped structure facing a direction towards the feeding coaxial line.

4. The dual-band antenna according to claim 2, wherein the grounding terminal of the second surface of the first substrate is connected to a base of the motor by a conducting wire or a metal wire.

5. The dual-band antenna according to claim 1, wherein the first microstrip feeder is connected to a motor of the unmanned aerial vehicle.

6. The dual-band antenna according to claim 5, wherein the first frequency band microstrip antenna further comprises:
    a U-shaped structure disposed on the second surface of the first substrate;
    the grounding terminal of the second surface being disposed along a length direction of the first substrate and being located in the middle of an opening of the U-shaped structure; the grounding terminal of the second surface being connected to the second microstrip feeder through a bottom end of the U-shaped structure; the opening of the U-shaped structure facing a direction towards the feeding coaxial line.

7. The dual-band antenna according to claim 1, wherein
    a shape of the first micro strip feeder is a straight line along the length direction of the first substrate; and
    a shape of the second microstrip feeder is a curve.

8. The dual-band antenna according to claim 1, further comprising at least one through hole provided on the first substrate, the grounding terminal of the first surface being connected to the grounding terminal of the second surface through the at least one through hole.

9. The dual-band antenna according to claim 1, wherein the second microstrip feeder is connected to a second terminal of the first microstrip feeder.

10. The dual-band antenna according to claim 9, wherein the second microstrip feeder is connected to the second terminal of the first microstrip feeder by a conducting wire or a metal wire.

11. The dual-band antenna according to claim 1, wherein the first substrate is made of an FR-4 grade material; and the second substrate is made of an FR-4 grade material.

12. The dual-band antenna according to claim 1, wherein the first frequency band microstrip antenna is a microstrip antenna of 900 MHz;
the second frequency band microstrip antenna is a microstrip antenna of 2.4 GHz.

13. The dual-band antenna according to claim 1, wherein main radiation units of the first frequency band microstrip antenna comprise the first substrate, the first microstrip feeder disposed on the first surface of the first substrate, the grounding terminal disposed on the first surface of the first substrate and the grounding terminal disposed on the second surface of the first substrate.

14. The dual-band antenna according to claim 1, wherein main radiation units of the second frequency band microstrip antenna comprise the second substrate and the second microstrip feeder disposed on the second substrate.

15. The dual-band antenna according to claim 1, wherein an overall size of the first substrate of the first frequency band microstrip antenna is $87 \times 18 \times 0.6$ mm$^3$, that is, a length of the first substrate is 87 mm, a width of the first substrate is 18 mm, and a thickness of the first substrate is 0.6 mm.

16. The dual-band antenna according to claim 1, wherein an overall size of the second substrate of the second frequency band microstrip antenna is $47 \times 7 \times 0.8$ mm$^3$, that is, a length of the second substrate is 47 mm, a width of the second substrate is 7 mm, and a thickness of the second substrate is 0.8 mm.

17. The dual-band antenna according to claim 1, wherein the first frequency band microstrip antenna adopts a form of a dipole, and the second frequency band microstrip antenna adopts a form of a monopole.

18. The dual-band antenna according to claim 1, the grounding terminal of the second surface where the second surface of the first frequency band microstrip antenna is in contact with a motor wire and a lamp panel wire located in the middle of the first substrate.

19. The dual-band antenna according to claim 1, the grounding terminal of the second surface is located on the second surface of the first substrate where it overlaps projections of a motor wire and a lamp panel wire.

20. An unmanned aerial vehicle, comprising an arm and a landing gear, and further comprising the unmanned aerial vehicle built-in dual-band antenna according to claim 1, the first frequency band microstrip antenna of the unmanned aerial vehicle built-in dual-band antenna being disposed in the arm, and the second frequency band microstrip antenna of the unmanned aerial vehicle built-in dual-band antenna being disposed in the landing gear.

* * * * *